US012569913B2

(12) United States Patent
Filkins et al.

(10) Patent No.: US 12,569,913 B2
(45) Date of Patent: Mar. 10, 2026

(54) ENERGY BEAM DIRECTING DEVICE

(71) Applicant: General Electric Company,
Schenectady, NY (US)

(72) Inventors: Robert John Filkins, Niskayuna, NY
(US); Thomas Charles Adcock,
Glenville, NY (US)

(73) Assignee: General Electric Company, Evendale,
OH (US)

( * ) Notice: Subject to any disclaimer, the term of this
patent is extended or adjusted under 35
U.S.C. 154(b) by 0 days.

(21) Appl. No.: 17/887,567

(22) Filed: Aug. 15, 2022

(65) Prior Publication Data

US 2024/0051029 A1 Feb. 15, 2024

(51) Int. Cl.
B29C 64/153 (2017.01)
B22F 12/46 (2021.01)
B22F 12/49 (2021.01)
B33Y 30/00 (2015.01)

(52) U.S. Cl.
CPC .............. B22F 12/46 (2021.01); B22F 12/49
(2021.01); B33Y 30/00 (2014.12)

(58) Field of Classification Search
CPC ........ B22F 12/46; B22F 12/49; B29C 64/135;
B29C 64/153; B29C 64/268
See application file for complete search history.

(56) References Cited

U.S. PATENT DOCUMENTS

| | | | |
|---|---|---|---|
| 5,383,168 A | 1/1995 | O'Brien et al. | |
| 6,320,705 B1 * | 11/2001 | Dube' | G02B 7/023 |
| | | | 359/666 |
| 6,836,364 B2 | 12/2004 | Dube et al. | |
| 6,992,843 B2 * | 1/2006 | Juhala | G02B 26/0883 |
| | | | 359/821 |
| 7,017,815 B2 | 3/2006 | Wood | |
| 2016/0221120 A1 | 8/2016 | Narita et al. | |
| 2016/0297034 A1 | 10/2016 | Bruck et al. | |
| 2018/0141160 A1 | 5/2018 | Karp et al. | |
| 2019/0240777 A1 | 8/2019 | Kamigawara et al. | |
| 2022/0063020 A1 | 3/2022 | Heinrici et al. | |
| 2022/0168960 A1 * | 6/2022 | Muller | B29C 64/135 |

FOREIGN PATENT DOCUMENTS

| | | | |
|---|---|---|---|
| DE | 102007018400 A1 | 10/2008 | |
| EP | 0903608 A2 | 3/1999 | |
| EP | 3040151 A1 | 7/2016 | |
| EP | 3556507 A1 | 10/2019 | |
| EP | 3280562 B1 | 12/2019 | |
| WO | WO2015029467 A1 | 3/2015 | |
| WO | WO2020/099172 A1 | 5/2020 | |

* cited by examiner

*Primary Examiner* — JaMel M Nelson

*Assistant Examiner* — Erica Hartsell Funk

(74) *Attorney, Agent, or Firm* — Wood Herron & Evans
LLP

(57) ABSTRACT

An additive manufacturing machine and an energy beam
system including an energy beam generator configured to
output an energy beam through a first optical element along
a first direction is provided. The energy beam system
includes an optical translation system positioned to receive
the energy beam through a steering optic. The steering optic
is positioned within a translator apparatus. The translator
apparatus is configured to translate the steering optic along
a plane perpendicular to the first direction.

19 Claims, 12 Drawing Sheets

500

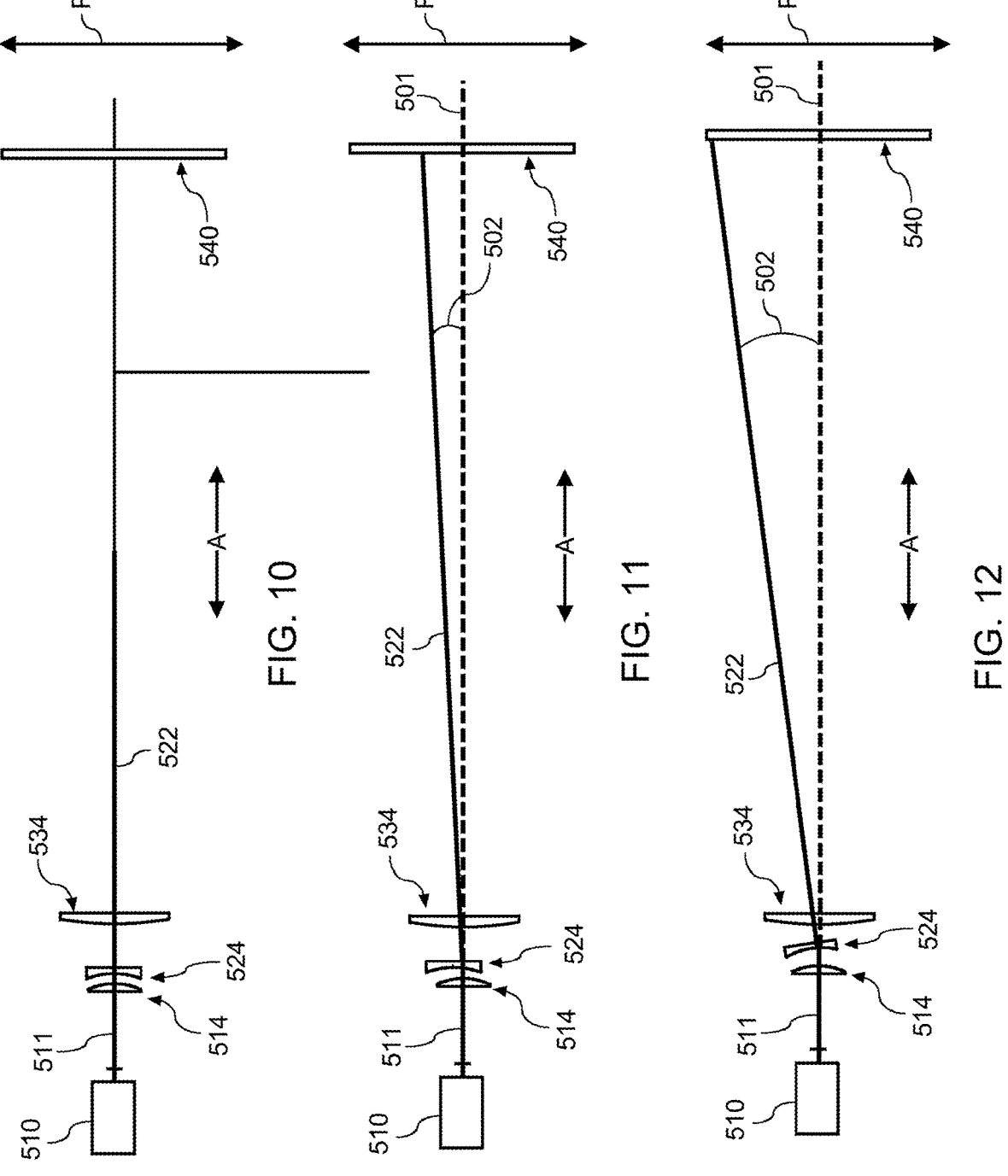

ENERGY BEAM DIRECTING DEVICE

FIELD

The present disclosure generally relates to a directing device for an energy beam, such as a laser system. The present disclosure relates further to a directing device for an energy beam for an additive manufacturing machine.

BACKGROUND

Additive manufacturing (AM) encompasses a variety of technologies for producing components in an additive, layer-wise fashion. AM apparatuses generally include a focused energy beam or laser system directed to a material. For instance, in powder bed fusion, a focused energy beam is moved and directed to fuse powder particles together on a layer-wise basis. The energy beam may be either an electron beam or laser. Laser powder bed fusion processes are referred to in the industry by many different names, the most common of which being selective laser sintering (SLS) and selective laser melting (SLM), depending on the nature of the powder fusion process. When the powder to be fused is metal, the terms direct metal laser sintering (DMLS) and direct metal laser melting (DMLM) are commonly used.

However, there is a need for improved systems for directing energy beams, such as may reduce size and packaging, and allow for improved or limited field distortion and improved effectiveness of focal optics.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIG. 10 illustrates a schematic view of the energy beam system in a neutral position in accordance with aspects of the present disclosure;

FIG. 11 illustrates a schematic view of the energy beam system translated in accordance with aspects of the present disclosure;

FIG. 12 illustrates a schematic view of the energy beam system translated in accordance with aspects of the present disclosure;

Figure 1:
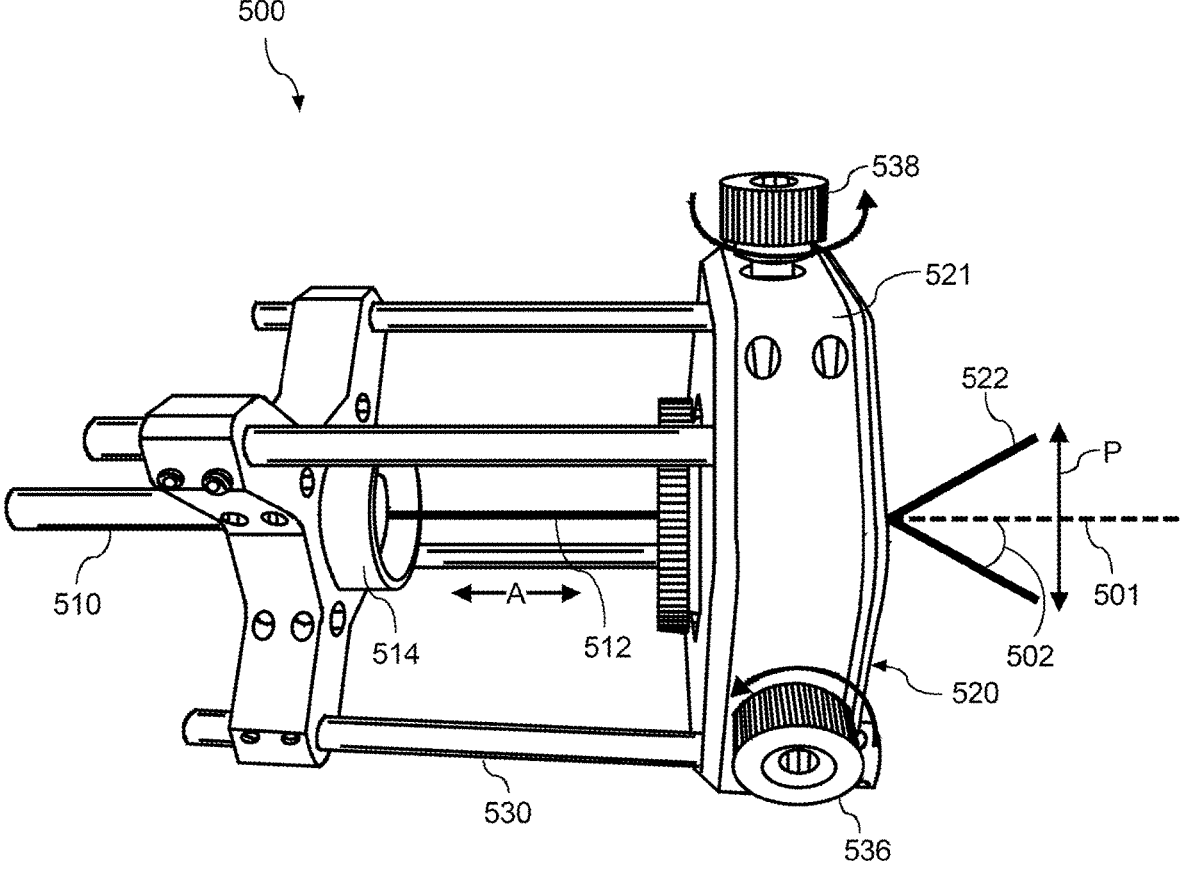
FIG. 1 illustrates a perspective view of an embodiment of an energy beam system in accordance with aspects of the present disclosure.

Repeat use of reference characters in the present specification and drawings is intended to represent the same or analogous features or elements of the present disclosure.

DETAILED DESCRIPTION

Reference now will be made in detail to embodiments of the disclosure, one or more examples of which are illustrated in the drawings. Each example is provided by way of explanation of the disclosure, not a limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

As described herein, the presently disclosed subject matter involves the use of additive manufacturing machines or systems. As used herein, the term "additive manufacturing" refers generally to manufacturing technology in which components are manufactured in a layer-by-layer manner. An exemplary additive manufacturing machine may be configured to utilize any desired additive manufacturing technology. The additive manufacturing machine may utilize an additive manufacturing technology that includes a powder bed fusion (PBF) technology, such as a direct metal laser melting (DMLM) technology, a selective laser melting (SLM) technology, a directed metal laser sintering (DMLS) technology, or a selective laser sintering (SLS) technology. In an exemplary PBF technology, thin layers of powder material are sequentially applied to a build plane and then selectively melted or fused to one another in a layer-by-layer manner to form one or more three-dimensional objects. Additively manufactured objects are generally monolithic in nature and may have a variety of integral sub-components.

Additionally or alternatively, suitable additive manufacturing technologies include, for example, Fused Deposition Modeling (FDM) technology, Direct Energy Deposition (DED) technology, Laser Engineered Net Shaping (LENS) technology, Laser Net Shape Manufacturing (LNSM) technology, Direct Metal Deposition (DMD) technology, Digital Light Processing (DLP) technology, Vat Polymerization (VP) technology, Stereolithography (SLA) technology, and other additive manufacturing technology that utilizes an energy beam.

Additive manufacturing technology may generally be described as fabrication of objects by building objects point-by-point, layer-by-layer, typically in a vertical direction. Other methods of fabrication are contemplated and within the scope of the present disclosure. For example, although the discussion herein refers to the addition of material to form successive layers, the presently disclosed subject matter may be practiced with any additive manufacturing technology or other manufacturing technology, including layer-additive processes, layer-subtractive processes, or hybrid processes.

The additive manufacturing processes described herein may be used for forming components using any suitable material. For example, the material may be metal, ceramic, polymer, epoxy, photopolymer resin, plastic, concrete, or any other suitable material that may be in solid, liquid, powder, sheet material, wire, or any other suitable form. Each successive layer may be, for example, between about 10 m and about 200 m, although the thickness may be determined based on any number of parameters and may be any suitable size.

As used herein, the term "build plane" refers to a plane defined by a surface upon which an energy beam impinges during an additive manufacturing process. Generally, the surface of a powder bed defines the build plane. During irradiation of a respective layer of the powder bed, a previously irradiated portion of the respective layer may define a portion of the build plane, and/or prior to distributing powder material across a build module, a build plate that supports the powder bed generally defines the build plane.

It is understood that terms such as "top", "bottom", "outward", "inward", and the like are words of convenience and are not to be construed as limiting terms. As used herein, the terms "first", "second", and "third" may be used interchangeably to distinguish one component from another and are not intended to signify location or importance of the individual components. The terms "a" and "an" do not denote a limitation of quantity, but rather denote the presence of at least one of the referenced item.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Galvanometers for laser systems generally include mirror and motor assemblies for directing and focusing a laser beam toward a desired surface or location. Such systems are relatively large and bulky, which is generally undesirable for increasingly compact systems that may utilize lasers, such as additive manufacturing machines, laser cutting or welding machines, or directed-energy systems. Galvanometer systems generally may not pivot about a single point, which leads to field distortion and may limit effectiveness of focal optics.

Embodiments of an energy beam system are provided herein. The energy beam system includes an optical translation system that may remove or obviate a need or desire for rotational galvanometer motors and mirrors. The system generates beam deflection by translating a steering optic via the translation system along a plane to induce an angular shift in the energy beam from the steering optic. As used herein, inducing an angular shift in the energy beam, and derivations thereof, refers to inducing an angular change in direction of the energy beam with respect to the original direction of the energy beam. The translation system desirably centers and off-centers the steering optic relative to an energy beam received from an energy beam generator. The off-centered energy beam relative to the steering optic shifts the angle of the energy beam from that received at the steering optic. Movement or translation of the steering optic is via one or more structures or methods for linear motion actuation depending on desired speed, precision, and cost. Such linear motion actuation structures include piezo transducers, solenoids, voice coils, pulley-based systems, screw-based systems, or linear actuators generally, or combinations thereof. Embodiments provided herein allow for co-axial or co-linear arrangement of the energy beam generator and optical element(s). Such arrangements may allow for smaller or tighter packaging, improved precision, improved accuracy, and reduced distortion of the energy beam in contrast to conventional galvanometer systems, mirror-based systems, or prism-based systems.

Conventional galvanometers, including rotational motors or mirrors, generally pivot about a single point, which may cause field distortion or otherwise limit the effectiveness of F-theta focal optics. Galvanometers generally require an approximately 90-degree beam path turn, or additionally a beam offset. Galvanometers may generally be relatively bulky. The relative size or bulk of galvanometers, which may be induced at least in part by requiring a beam path turn, is generally detrimental to the size, scalability, operation, or accuracy of laser systems.

Referring now to FIG. 1, an embodiment of an energy beam system 500 (hereinafter, "system") is provided in accordance with aspects of the present disclosure. The system 500 includes an energy beam generator 510 configured to output an energy beam 512, such as a laser beam or other light emission. The system 500 further includes an optical translation system 520 positioned to receive the energy beam 512 from the energy beam generator 510 along a first direction A. Various embodiments of the energy beam generator 510 include a first optical element 514 from which the energy beam 512 is emitted along the first direction A. The optical element 514 may particularly form a collimator or collimating lens configured to narrow an input energy beam 512 to a smaller diameter and/or align along the first direction A, such as depicted via energy beam 512. In other embodiments, the optical element 514 is a different type of lens (e.g., a concave or convex lens) such that the energy beam 512 is not collimated (e.g., having a beam working distance that is not infinite).

Various embodiments of the system 500 include a member 530 extended substantially along the first direction A. The member 530 is connected to the energy beam generator 510 and an optical translation system 520. In certain embodiments, the member 530 fixes the energy beam generator 510 to a housing 521 at which a steering optic 524 and translator apparatus 525 is contained, such as depicted in exemplary embodiments of internal views of the housing 521 depicted in FIGS. 2-3. The housing 521 may attach or fix actuation devices configured to translate or otherwise move the steering optic 524 such as described herein. In other embodiments, such as further provided below with regard to FIG. 9, the member 530 is an actuation member allowing for linear motion actuation along the first direction A.

Figure 2:
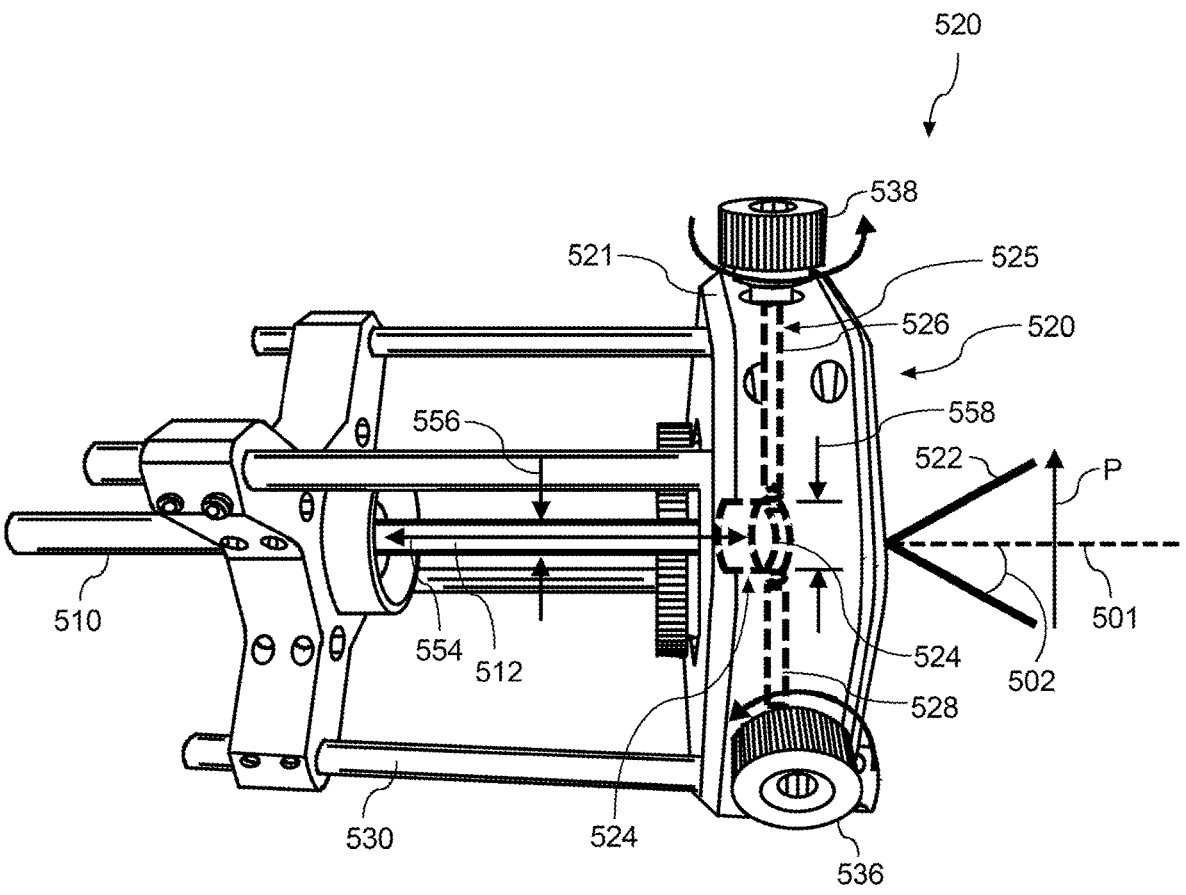
FIG. 2 illustrates a partial internal view of a portion of an embodiment of the energy beam system of FIG. 1 in accordance with aspects of the present disclosure.
Figure 3:
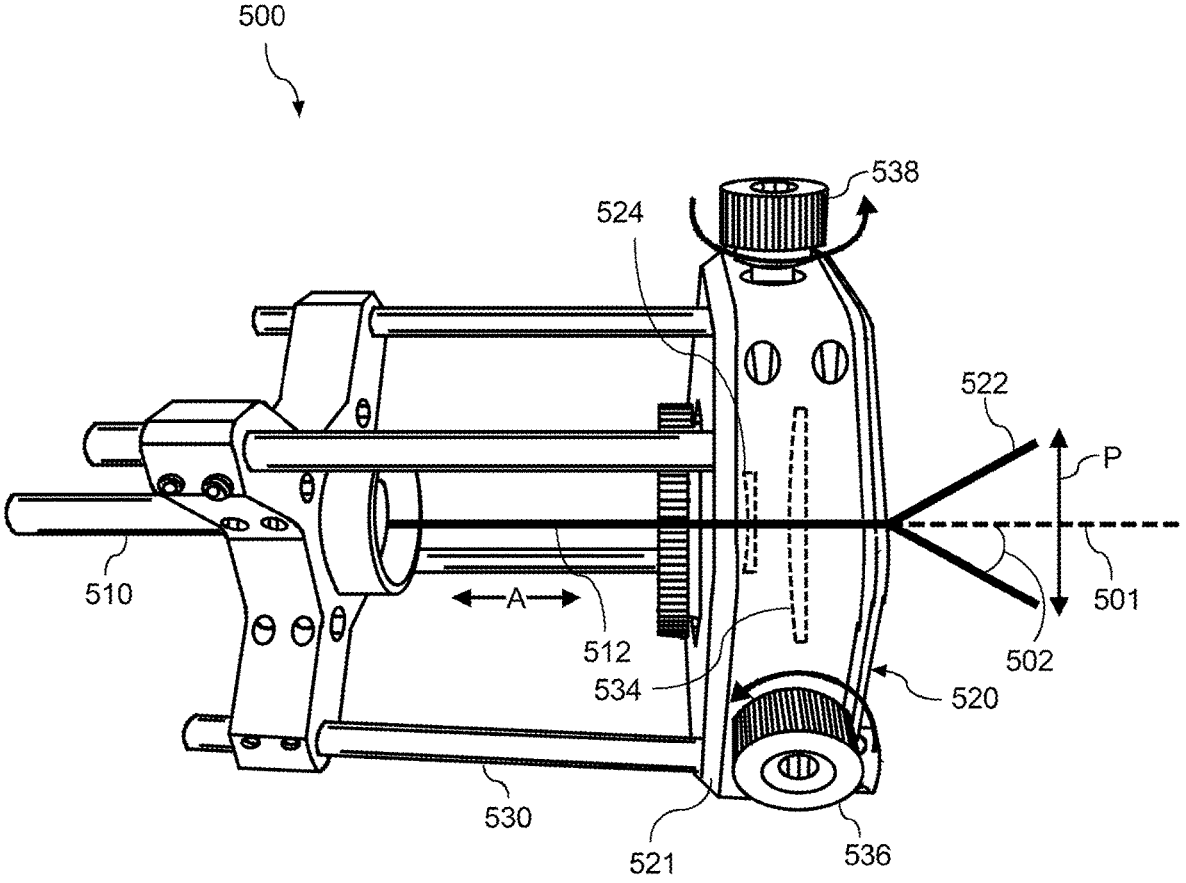
FIG. 3 illustrates a partial internal view of a portion of an embodiment of the energy beam system of FIG. 1 in accordance with aspects of the present disclosure.

Referring to FIG. 2, an internal view of exemplary embodiments of the optical translation system 520 is provided. The optical translation system 520 includes the steering optic 524 through which the energy beam 512 passes. In some embodiments, the first optical element 514 and the steering optic 524 are in collimated arrangement. In certain embodiments, such as depicted in FIG. 3, the housing 521 contains a third optical element 534 in collimated arrangement with the first optical element 514 and the steering optic 524. One or more portions of the steering optic 524 is operably connected to a translator apparatus 525, such as further described below.

Referring to FIG. 2, the system 500 may output the energy beam 512 from the energy beam generator 510 and first optical element 514 with a beam diameter 556. The beam diameter 556 is less than a lens diameter 558 at the steering optic 524. In various embodiments, the beam diameter 556 of the energy beam 512 provided to the steering optic 524 is as follows:

$$\text{Beam Diameter} \le \frac{\text{Lens Diameter}}{n}$$

In particular embodiments, n is between 8 and 20, inclusively. In certain embodiments, the particular ranges provided herein allow for co-linear arrangement of the energy beam generator 510, the first optical element 514, and the steering optic 524. In still certain arrangements, the particular ranges provided herein allow for co-linear arrangement of the energy beam generator 510, the first optical element 514, the steering optic 524, and the third optical element 534. Such arrangements allow for smaller or tighter packaging, improved precision, improved accuracy, and reduced distortion of an output energy beam 522 output from the steering optic 524 and/or third optical element 534, in contrast to conventional galvanometer systems, mirror-based systems, or prism-based systems. Such arrangements may further allow for desired translation of the energy beam 522 onto a surface 540, such as depicted with regard to FIGS. 11-12.

Various embodiments of the system 500 include the first optical element 514, the steering optic 524, or the third optical element 534 as defining one or more transmissive optical devices, such as a lens, configured to focus or disperse the energy beam 512 via refraction. In one embodiment, the optical elements 514, 524, 534 include a converging lens, a convex lens, or a double-convex lens, or other appropriate type of transmissive optical device configured to receive the energy beam and output the energy beam therethrough to cross at a single point. In still various embodiments, the optical elements 514, 524, 534 include a diverging lens or other appropriate type of transmissive optical device configured to diverge the energy beam 512 after refraction.

Figure 4:
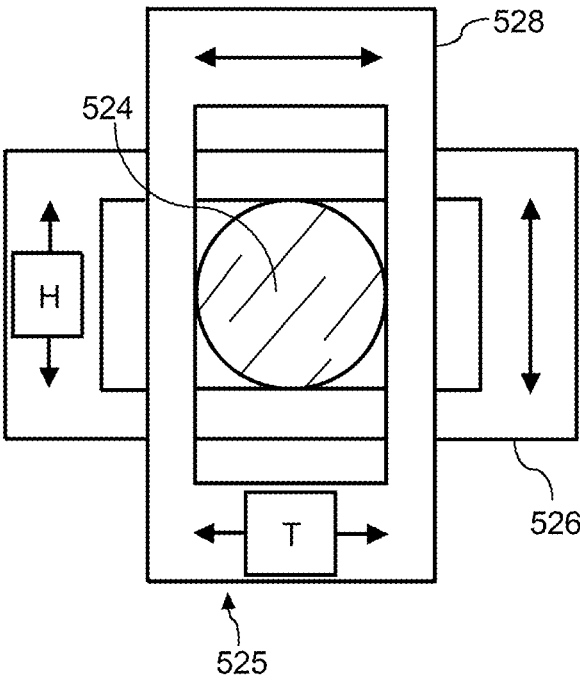
FIG. 4 illustrates a view of an embodiment of a translation apparatus of the energy beam system in accordance with aspects of the present disclosure.

Referring now to FIG. 4, a view of an exemplary embodiment of the translator apparatus 525 is provided. Particular embodiments of the translator apparatus 525 depicted in FIG. 4 are operably positioned within the optical translation system 520 depicted in FIG. 2. The translator apparatus 525 is configured to translate the steering optic 524 along a plane P (FIGS. 1-3), such as formed along first steering direction H and second steering direction T depicted in FIG. 4. The translator apparatus 525 allows the steering optic 524 to articulate along the plane P (FIGS. 1-3) to adjust an output angle 502 of the energy beam 522 refracted from the steering optic 524.

In the embodiment depicted in FIG. 3, the translator apparatus 525 includes a first translator device 526 configured to translate the steering optic 524 along a first steering direction H that is non-parallel (e.g., substantially perpendicular) to the first direction A. The translator apparatus 525 further includes a second translator device 528 configured to translate the steering optic 524 along a second steering direction T that is non-parallel (e.g., substantially perpendicular) to the first direction A and the second direction H. In various embodiments, the translator apparatus 525 is configured to translate the steering optic 524 along the plane P (FIGS. 1-3) that is non-parallel (e.g., perpendicular) to the first direction A.

Figure 7:
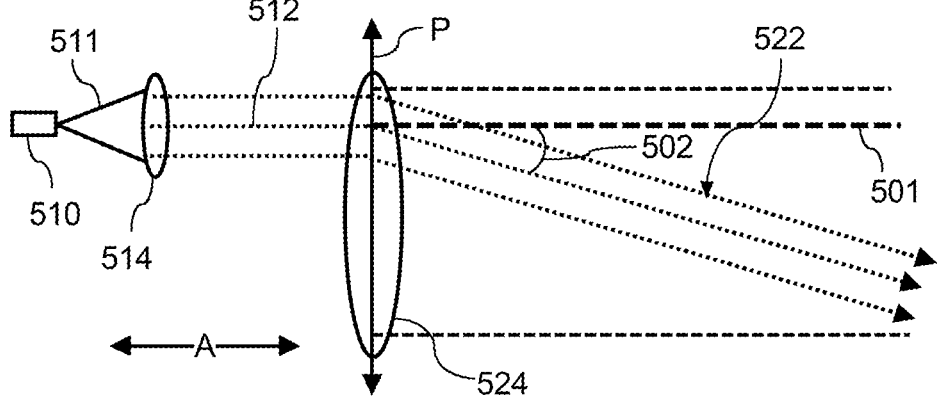
FIG. 7 illustrates an exemplary translation of the optical element of the energy beam system in accordance with aspects of the present disclosure.
Figure 8:
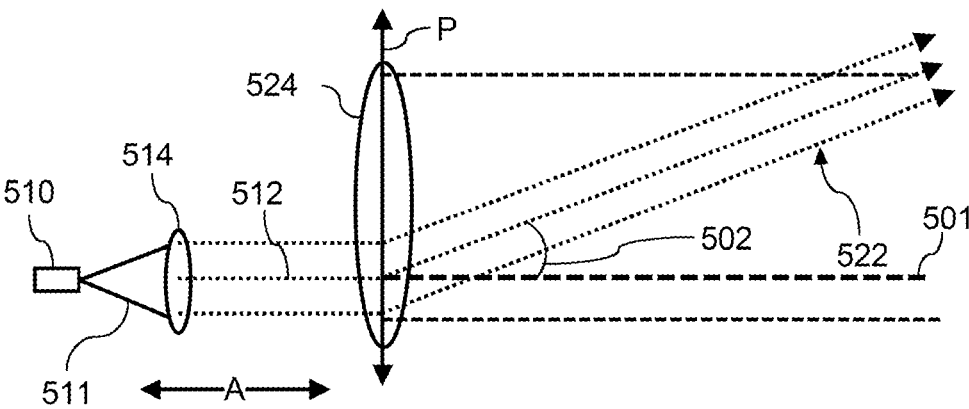
FIG. 8 illustrates an exemplary translation of the optical element of the energy beam system in accordance with aspects of the present disclosure.

During operation of the system 500, the energy beam generator 510 emits the energy beam 512 along the first direction A toward the steering optic 524 at optical translation system 520. The system 500 desirably deflects the energy beam 512 received from the energy beam generator 510, such as depicted schematically at energy beam 522 in FIGS. 7-12. The optical translation system 520 including the translator apparatus 525 and the steering optic 524 deflects the energy beam 522 by translating the steering optic 524 along the first steering direction H and/or the second steering direction T to induce an angular shift in the energy beam 522 from the steering optic 524, such as depicted at angle 502 relative to an axis 501. The axis 501 corresponds to the energy beam 512 emitted from the energy beam generator 510 and through the first optical element 514 along the first direction A. Further depictions and descriptions of the shift in angle 502 are provided below with regard to FIGS. 7-12, further described below. The translation system 520 desirably centers and off-centers the steering optic 524 relative to the energy beam 512 received from the energy beam generator 510. It is noted that the energy beam 512 is shown as parallel for illustration purposes only, and that the energy beam 512 may be diverging or converging depending on the embodiment. Referring to FIGS. 7 and 8, if the intermediate beam 512 is divergent, then the section of the beam hitting the outer portion of the second optic 524 (upper in FIG. 7, lower in FIG. 8) is deflected more than the section of the intermediate beam 512 that hits nearer the center of the second optic 524. The difference in deflection across the second optic is what provides the steering effect as 510, 511 and 512 are moved as a unit. Alternately, the intermediate beam 512 may cross itself if packaging constraints force the length A to be particularly long.

Embodiments of the system 500 provided herein allow for co-directional arrangement (i.e., positioned in adjacent arrangement along the first direction A) of the energy beam generator 510, the first optical element 514, and steering optic 524. Particular embodiments of the system 500 include the co-directional arrangement of the first optical element 514 at the energy beam generator 510, the steering optic 524, and the third optical element 534 along the first direction A.

Referring to FIG. 4, the translator apparatus 525 may include the translator devices 526, 528 configured as rails extended along the respective steering directions H, T along which the steering optic 524 moves. Referring to FIGS. 1-3, and further in conjunction with FIG. 4, the translation system 520 may further include a first actuation device 536 operably coupled to the first translator device 526 and a second actuation device 538 operably coupled to the second translator device 528. The actuation devices 536, 538 may generally define one or more linear motion actuation systems. In particular embodiments, the translator apparatus 525 forming a linear motion actuation system includes a piezo transducer, a solenoid actuator, a voice coil actuator, a pulley-based system, a screw-based system, or other appropriate linear actuator, or combinations thereof.

The actuation devices are configured to move, articulate, or otherwise translate the translator apparatus 525 along the plane P. The first actuation device 536 is operably coupled to articulate, translate, or otherwise move one or more portions of the steering optic 524 along the second direction H. In a particular embodiment, the first actuation device 536 is operably coupled to the first translator device 526 to move the steering optic 524 along the second direction H. The second actuation device 538 is operably coupled to articulate, translate, or otherwise move one or more portions of the steering optic 524 along the third direction T. In a particular embodiment, the second actuation device 538 is operably coupled to the second translator device 528 to move the steering optic 524 along the third direction T.

Figure 5:
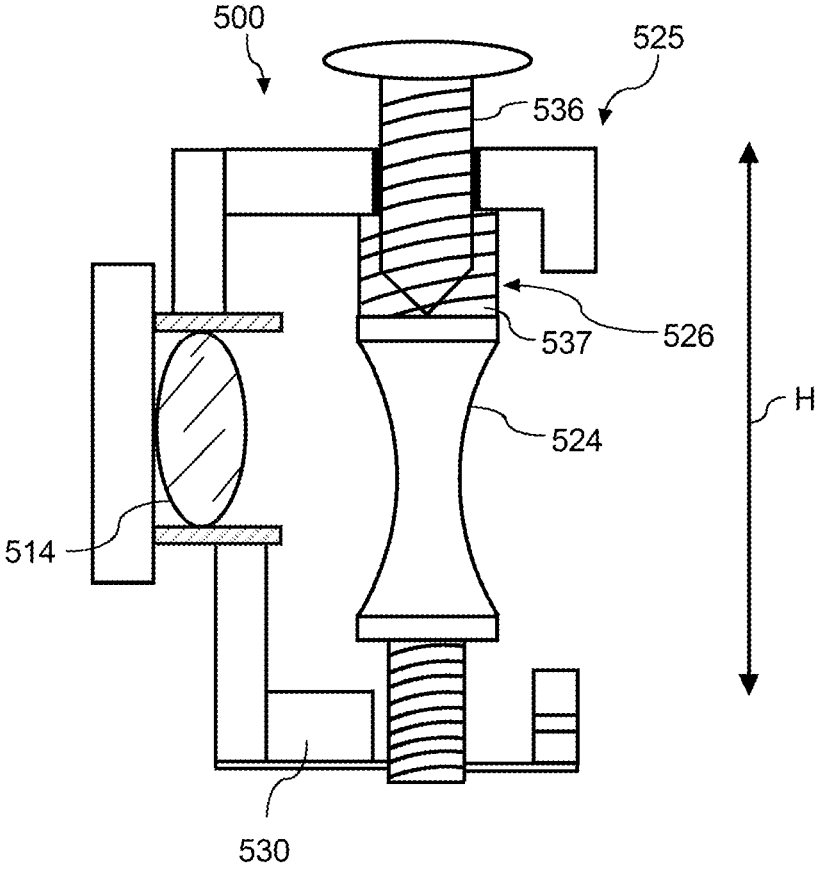
FIG. 5 illustrates a view of an embodiment of the translation apparatus of FIG. 4 in accordance with aspects of the present disclosure.
Figure 6:
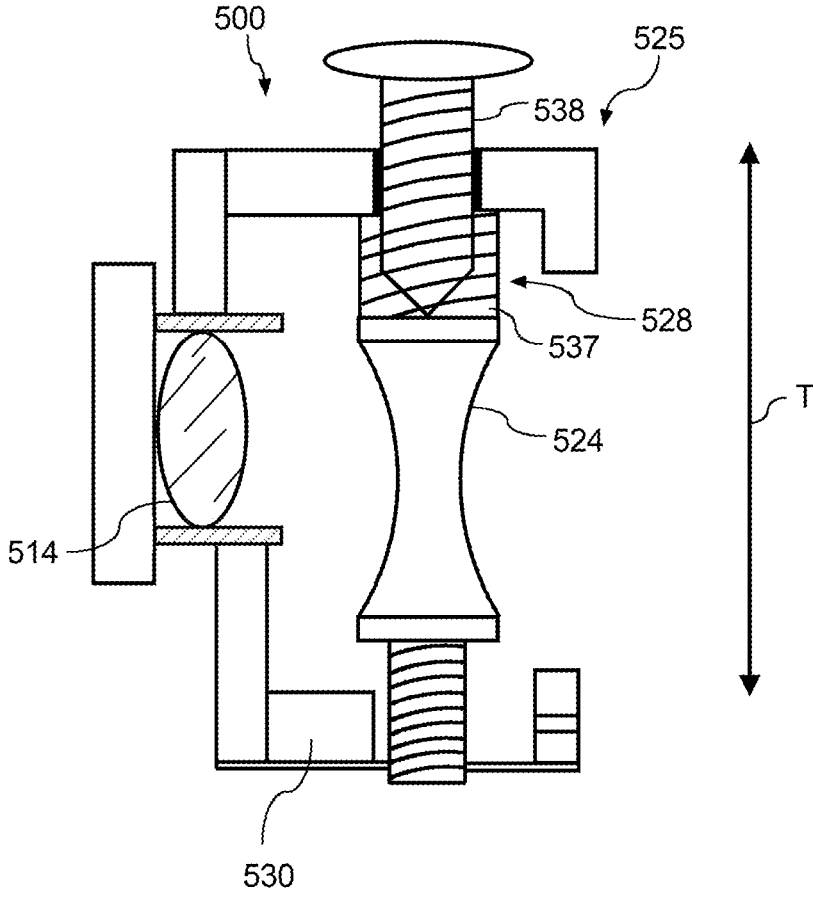
FIG. 6 illustrates a view of an embodiment of the translation apparatus of FIG. 4 in accordance with aspects of the present disclosure.

Referring now to FIGS. 5-6, an embodiment of the translation system 520 is provided. The embodiments provided in FIGS. 5-6 may be utilized with the embodiments of the system 500 depicted in FIGS. 1-4. The embodiment provided in FIG. 5 includes a portion of the translator apparatus 525, including the first actuation device 536 operably connected to the first translator device 526. The first actuation device 536 may be configured as a screw-based system, such as depicted at a threaded interface 537 at the first actuation device 536 and the first translator device 526. In a particular embodiment, the first actuation device 536 configured as a screw-based system allows the steering optic 524 to translate along the first steering direction H based on engagement and disengagement of threads at the threaded interface 537. In a particular embodiment, the steering optic 524 is translated relative to the first optical element 514.

Referring now to FIG. 6, a portion of the translator apparatus, including the second actuation device 538 is operably connected to the second translator device 528. The second actuation device 538 may be configured as a screw-based system, such as depicted at the threaded interface 537 at the second actuation device 538 and the second translator device 528. In a particular embodiment, the second actuation device 538 configured as a screw-based system allows the steering optic 524 to translate along the second steering direction T based on engagement and disengagement of threads at the threaded interface 537. In a particular embodiment, the steering optic 524 is translated relative to the first optical element 514.

Referring now to FIGS. 7-8, exemplary depictions of the movement of the steering optic 524 relative to the first optical element 514 are provided. FIGS. 7-8 depict changes in angle 502 of the energy beam 522 output from the steering optic 524 relative to the axis 501. The depictions in FIGS. 7-8 correspond to movements allowed by embodiments of the system in FIGS. 1-6. For instance, FIGS. 5-6 depict and describe the translation system 520 allowing the steering optic 524 to translate relative to the first optical element 514 and the axis 501.

Figure 9:
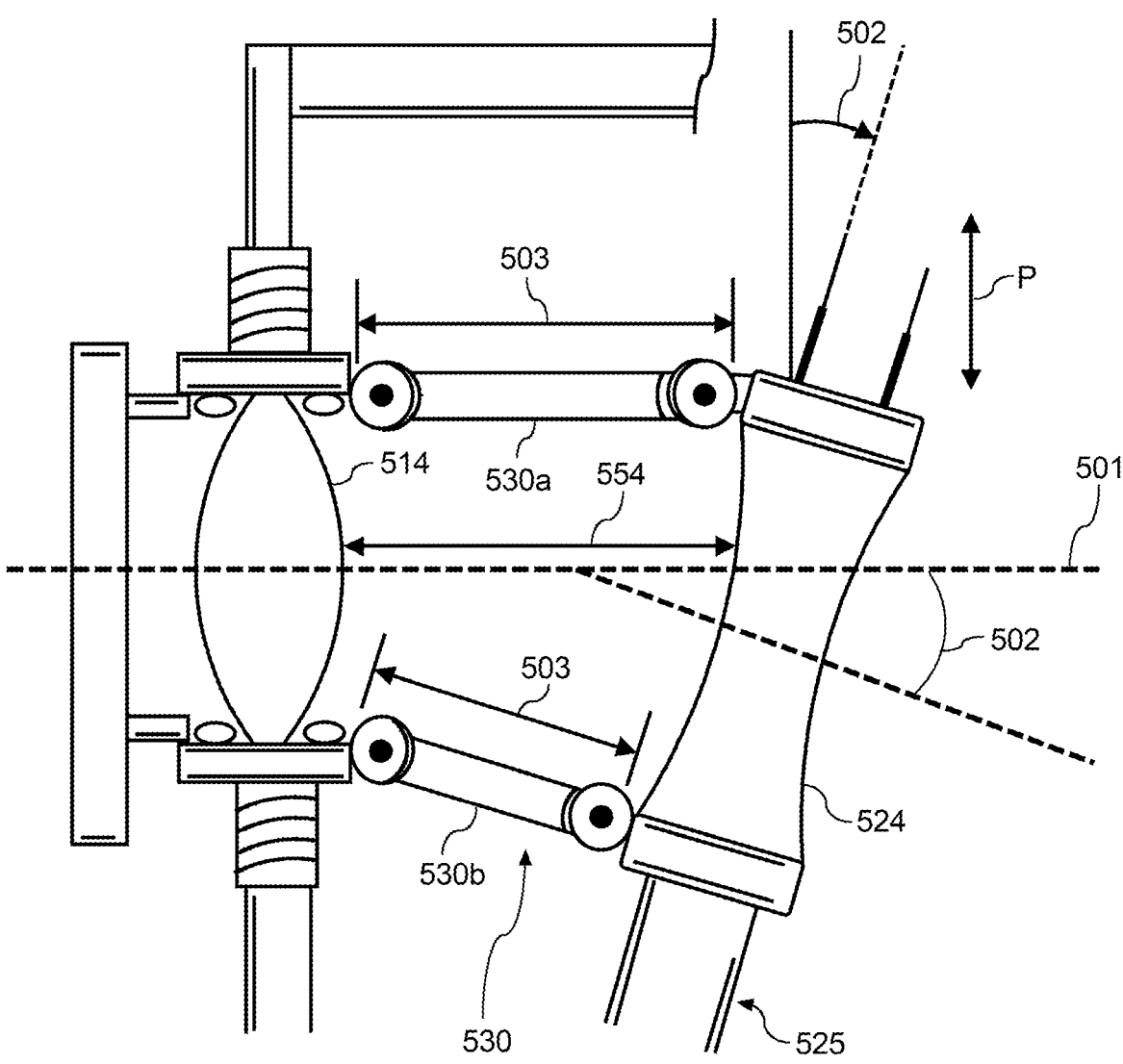
FIG. 9 illustrates an exemplary translation of the translation system of the energy beam system in accordance with aspects of the present disclosure.

Referring now to FIG. 9, the system 500 may further be configured to tilt one or more portions of the steering optic 524 along an angle 502 relative to axis 501. The translator apparatus 525 includes an actuation member 530 coupling the first optical element 514 to the steering optic 524. Various embodiments of the actuation member 530 include a linear motion actuation system(s) such as described above, including, but not limited to, a piezo transducer, a solenoid actuator, or a voice coil actuator. In a particular configuration, the actuation member 530 includes a first actuation member 530*a* and a second actuation member 530*b* each separated along plane P and extendable along a length 503. In an exemplary nominal condition, the actuation members 530 are each extended along length 503 to position the steering optic 524 in co-directional arrangement with the first optical element 514 along the first direction A. The system 500 may extend or contract one or more of the actuation members 530*a*, 530*b* while fixing, or differently extending or contracting another actuation member 530*a*, 530*b*, such as to force the steering optic 524 to tilt relative to axis 501. In certain embodiments, the actuation members 530 are operably coupled to the translation system 520 such as described herein. The energy beam 512 (FIGS. 1-3) output from the first optical element 514 along axis 501 and received by the steering optic 524 is then translated off-axis along angle 502 as the energy beam 522 passes through the steering optic 524, such as depicted in various embodiments in FIGS. 10-12.

Referring now to FIGS. 10-12, depictions of changes and positionings of the steering optic 524 during operation of the system 500 depicted and described in FIGS. 1-9 are provided. In a particular configuration, the first optical element 514 is a positive concave lens, the steering optic 524 is a negative convex lens positioned between the first optical element 514 and the third optical element 534, and the third optical element 534 is a positive objective lens. It should be appreciated that other embodiments may include a plurality of one or more of the first optical element 514, the steering optic 524, or the third optical element 534.

FIG. 10 depicts the system 500 positioning the steering optic 524 in neutral position via various embodiments of the translation system 520 depicted in FIGS. 1-5, such as to allow the energy beam 522 to pass through the steering optic 524 and be received at a surface 540. The neutral position of the steering optic 524 depicted in FIG. 10 allows the energy beam 522 to be received at the surface 540 substantially along the same direction as received from the energy beam generator 510 and the first optical element 514 (e.g., along the axis 501).

Referring to FIG. 11, the steering optic 524 is translated by the translation system 520 depicted and described in regard to FIGS. 1-9. In particular, the steering optic 524 is shifted or translated along plane P off-axis from axis 501, such as described with regard to FIGS. 4-8. Accordingly, the energy beam 522 is output to surface 540 by a first magnitude from axis 501.

Referring to FIG. 12, in a particular embodiment, the translation system 520 is configured to tilt the steering optic 524 at the angle 502 relative to the axis 501. In a still particular embodiment, the steering optic 524 is tilted by the actuation member 530 such as depicted and described with regard to FIG. 9. Furthermore, the steering optic 524 is translated off axis 501, such as depicted and described with regard to FIG. 4-8. Accordingly, the energy beam 522 is output to surface 540 by a second magnitude from axis 501 greater than the first magnitude depicted in FIG. 11. As such, embodiments of the system 500 provided herein allow for movement, and relatively larger movement, of the energy beam 522 output onto the surface 540 while allowing for smaller or tighter packaging, improved precision, improved accuracy, and reduced distortion of the energy beam in contrast to conventional galvanometer systems, mirror-based systems, or prism-based systems.

In an exemplary embodiment, the system 500 may include the first optical element 514 forming a 75 millimeter (mm) positive concave lens, the steering optic 524 forming a 75 mm negative convex lens, and the third optical element 534 forming a 400 mm positive objective lens. The system 500 may shift the steering optic 524 by 4.5 mm along the plane P and relative to the first optical element 514, such as depicted in FIG. 11. The translation system 520 may further tilt the steering optic 524 to maintain roundness and/or compensate for astigmatism, such as depicted in FIG. 12. The configuration such as provided may allow the energy beam 522 to contact the surface 540 over a 100 mm diameter scan field relative to the axis 501.

Figure 13:
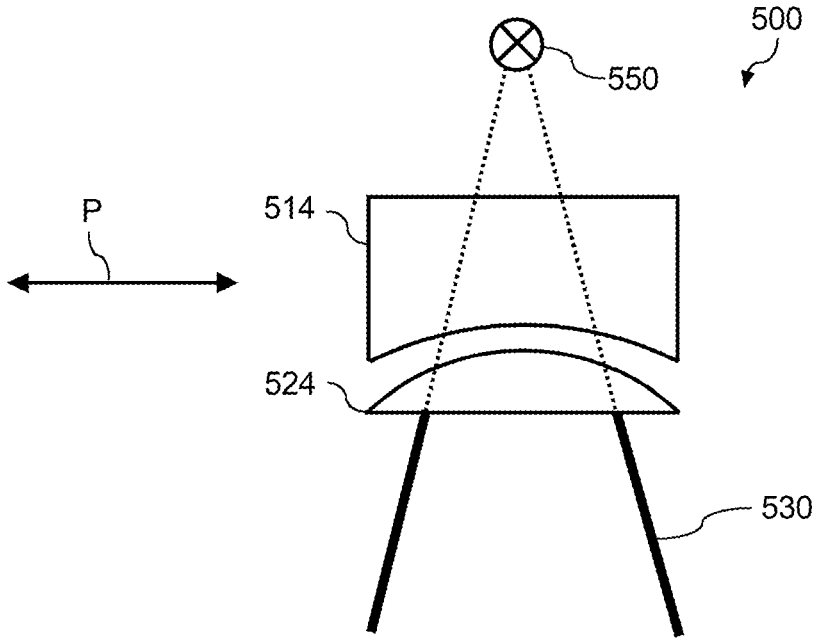
FIG. 13 depicts an exemplary embodiment of the energy beam system in accordance with aspects of the present disclosure.
Figure 14:
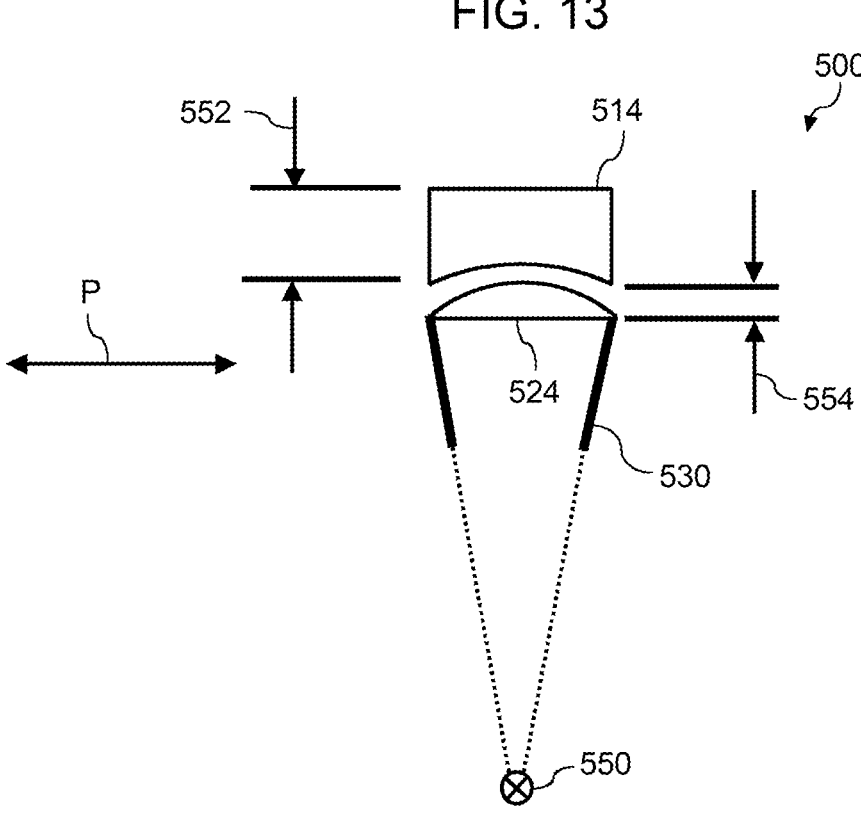
FIG. 14 depicts an exemplary embodiment of the energy beam system in accordance with aspects of the present disclosure.

Referring now to FIGS. 13-14, additional embodiments of a portion of the system 500 are provided. The embodiments provided in FIGS. 13-14 are configured substantially similarly as described with regard to FIGS. 1-12. In FIG. 13, the actuation member 530 is connected to the steering optic 524 in non-parallel arrangement with one another. The non-parallel arrangement may allow for the steering optic 524 to translate along plane P and angle 502 in relatively rapid, coordinate motion. The non-parallel arrangement of actuation members 530 pivots relative to a reference pivot point 550 positioned forward or aft of the first optical elements. The non-parallel, translatable actuation member 530 allows for aberration correction. In a particular embodiment, the steering optic 524 includes a focal strength ratio of the first optical element 514 to the steering optic 524 between 0.5 and 3.

Referring to FIG. 14 (and depicted in FIG. 2), a gap 554 is formed between the first optical element 514 and the steering optic 524. The first optical element 514 has a thickness 552. During operation of the system 500 provided herein, the member 530 is configured to position the first optical element 514 from the steering optic 524 within a range of up to 0.5 times (0.5×) the thickness 552 of the first optical element 514. In certain embodiments, such as described with regard to the member 530 including an actuation member, the member 530 may actuate, translate, or articulate the gap 554 between the first optical elements 514 and the steering optic 524 within the range of up to 0.5× the thickness 552. In various embodiments, the range is greater than zero. The gap 554 is generally such that the first optical element 514 and the steering optic 524 are non-contacting, and are separated along the gap 554 relative to the first direction A by a distance of up to half of the thickness 552 of the first optical element 514.

Figure 15:
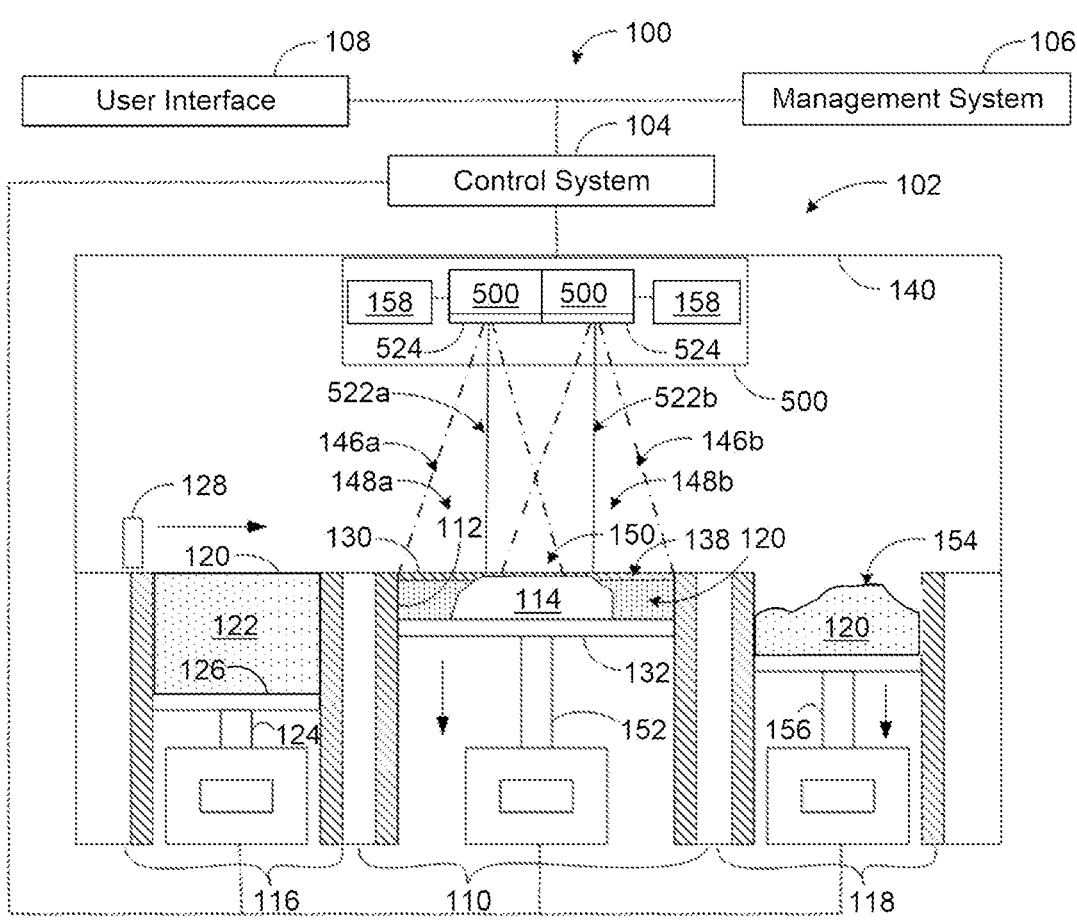
FIG. 15 schematically depicts an exemplary additive manufacturing apparatus including an exemplary energy beam system in accordance with aspects of the present disclosure.

Referring now to FIG. 15, a schematic depiction of an exemplary additive manufacturing system 100 is provided at which various embodiments of the system 500 is included. The additive manufacturing system 100 may include one or more additive manufacturing machines 102. The one or more additive manufacturing machines 102 may include a control system 104. The control system 104 may be included as part of the additive manufacturing machine 102 or the control system 104 may be associated with the additive manufacturing machine 102. The control system 104 may include componentry integrated as part of the additive manufacturing machine 102 and/or componentry that is provided separately from the additive manufacturing machine 102. Various componentry of the control system 104 may be communicatively coupled to various componentry of the additive manufacturing machine 102.

The control system 104 may be communicatively coupled with a management system 106 and/or a user interface 108. The management system 106 may be configured to interact with the control system 104 in connection with enterprise-level operations pertaining to the additive manufacturing system 100. Such enterprise level operations may include transmitting data from the management system 106 to the control system 104 and/or transmitting data from the control system 104 to the management system 106. The user interface 108 may include one or more user input/output devices to allow a user to interact with the additive manufacturing system 100.

As shown, an additive manufacturing machine 102 may include a build module 110 that includes a build chamber 112 within which an object or objects 114 may be additively manufactured. An additive manufacturing machine 102 may include a powder module 116 and/or an overflow module 118. The build module 110, the powder module 116, and/or the overflow module 118 may be provided in the form of modular containers configured to be installed into and removed from the additive manufacturing machine 102 such as in an assembly-line process. Additionally, or in the alternative, the build module 110, the powder module 116, and/or the overflow module 118 may define a fixed componentry of the additive manufacturing machine 102.

The powder module 116 contains a supply of powder material 120 housed within a supply chamber 122. The powder module 116 includes a powder piston 124 that elevates a powder floor 126 during operation of the additive manufacturing machine 102. As the powder floor 126 elevates, a portion of the powder material 120 is forced out of the powder module 116. A recoater 128 such as a blade or roller sequentially distributes thin layers of powder material 120 across a build plane 130 above the build module 110. A build platform 132 supports the sequential layers of powder material 120 distributed across the build plane 130. A build platform 132 may include a build plate (not shown) secured thereto and upon which an object 114 may be additively manufactured.

With reference to FIGS. 1-3 and 15, the additive manufacturing machine 102 can include one or more energy beam systems 500 configured to generate one or more of energy beams such as laser beams and to direct the respective energy beams onto the build plane 130 to selectively solidify respective portions of the powder bed 138 defining the build plane 130. For example, in some embodiments, the energy beam system 500 may comprise one or more energy beam generators 510 configured to output a plurality of energy beams, either directly or by splitting an original single energy beam into a plurality of energy beams. Each of the plurality of energy beams may be aligned in the same initial direction, different initial directions, or a combination thereof. The energy beam system may further comprise a plurality of optical translation systems 520 wherein each of the plurality of optical translation systems 520 can comprise a steering optic 524 positioned to receive one of the plurality of energy beams from the one or more energy beam generators 510; and a translator apparatus 525 configured to translate the steering optic 524 along a plane P to induce an angular shift in the one of the plurality of energy beams received by the steering optic 524.

The translator apparatus 525 can translate the steering optic in a planar direction that is non-parallel to (e.g., substantially perpendicular to) an initial direction of the one of the plurality of energy beams received by the steering optic. The optical translation systems 520 may thereby induce the same angular shift on a plurality of energy beams, may induce different angular shifts on a plurality of energy beams, or a combination thereof. For example, each optical translation system may be independently controlled such that it can independently induce a particular angular shift on its respective energy beam.

As the respective energy beams selectively melt or fuse the sequential layers of powder material 120 that define the powder bed 138, the object 114 begins to take shape. The one or more energy beams or laser beams may include electromagnetic radiation having any suitable wavelength or wavelength range, such as a wavelength or wavelength range corresponding to infrared light, visible light, and/or ultraviolet light. It should be appreciated that the powder bed 138 or object 114 may define the surface 540 depicted and described with regard to FIGS. 10-12.

Typically, with a DMLM, EBM, or SLM system, the powder material 120 is fully melted, with respective layers being melted or re-melted with respective passes of the energy beams. With DMLS or SLS systems, typically the layers of powder material 120 are sintered, fusing particles of powder material 120 to one another generally without reaching the melting point of the powder material 120. The energy beam system 500 may include componentry integrated as part of the additive manufacturing machine 102 and/or componentry that is provided separately from the additive manufacturing machine 102.

The additive manufacturing machine 102 may include a plurality of the energy beam system 500 configured to generate a plurality of energy beams 522 and to direct the energy beams upon the build plane 130, such as depicted and described with regard to FIGS. 1-14. The irradiation devices may respectively have the energy beam generator 510 of FIGS. 1-14. The plurality of optical elements associated with each energy beam system 500 allows for changes in contact and angle while minimizing translation of the steering optic 524. Additionally, the plurality of systems 500 allows for faster adjustment via translation of each respective steering optic 524 and selective emission of the energy beam 512 from desired energy beam generators 510.

The third optical element 534 (FIG. 3) may form a window, such as a protective glass, that separates one or more components of the energy beam system 500 from a process chamber 140 within which powder material is irradiated by one or more energy beams 522 to additively manufacture a three-dimensional object 114. The window or protective glass may separate the one or more components of the energy beam system 500, such as the steering optic 524, from conditions existing within the process chamber 140 of an additive manufacturing machine 102. Such window or protective glass may prevent contaminants associated with the additive manufacturing process, such as powder material, dust, soot, residues from fumes or vapor, and the like, from coming into contact with sensitive components of an energy beam system 500. Accumulation of contaminants upon various optical elements of the energy beam system 500 may adversely affect operation of the energy beam system 500 and/or quality metrics associated with an energy beam system 500. Additionally, or in the alternative, such contaminants may cause damage to various optical elements of the energy beam system 500, such as the energy beam generator 510.

As shown in FIG. 15, the energy beam system 500 includes the irradiation device or energy beam generator 510 and one or more optical elements 514, 524, 534 (FIGS. 10-12). Additionally, or in the alternative, the additive manufacturing machine 102 may include two, three, four, six, eight, ten, or more energy beam systems 500, and such systems 500 may include respective optical elements 514, 524. Each energy beam system 500 may be configured to respectively generate one or more energy beams 522 that are respectively scannable within a scan field incident upon at least a portion of the build plane 130. For example, the plurality of energy beam systems 500 may generate a first energy beam 522a that is scannable within a first scan field 146a via the steering optic 524 and incident upon at least a first build plane region 148a. Another energy beam system 500 may generate a second energy beam 522b that is scannable within a second scan field 146b via the steering optic 524 and incident upon at least a second build plane region 148b. The first scan field 146a and the second scan field 146b may overlap such that the first build plane region 148a scannable by the first energy beam 522a overlaps with the second build plane region 148b scannable by the second energy beam 522b. The overlapping portion of the first build plane region 148a and the second build plane region 148b may sometimes be referred to as an interlace region 150. Portions of the powder bed 138 to be irradiated within the interlace region 150 may be irradiated by the energy beam first energy beam 522a and/or the second energy beam 522b in accordance with the present disclosure.

To irradiate a layer of the powder bed 138, the energy beam generator 510 directs the energy beam 522 across the respective portions of the build plane 130 (e.g., the first build plane region 148a and the second build plane region 148b) to melt or fuse the portions of the powder material 120 that are to become part of the object 114. The first layer or series of layers of the powder bed 138 are typically melted or fused to the build platform 132, and then sequential layers of the powder bed 138 are melted or fused to one another to additively manufacture the object 114. As sequential layers of the powder bed 138 are melted or fused to one another, a build piston 152 gradually lowers the build platform 132 to make room for the recoater 128 to distribute sequential layers of powder material 120. The distribution of powder material 120 across the build plane 130 to form the sequential layers of the powder bed 138, and/or the irradiation imparted to the powder bed 138, may introduce contaminants, such as powder material, dust, soot, residues from fumes or vapor, and the like, into the environment of the process chamber 140. Such contaminants may accumulate on various optical elements associated with the energy beam system 500.

As the build piston 152 gradually lowers and sequential layers of powder material 120 are applied across the build plane 130, the next sequential layer of powder material 120 defines the surface of the powder bed 138 coinciding with the build plane 130. Sequential layers of the powder bed 138 may be selectively melted or fused until a completed object 114 has been additively manufactured. An additive manufacturing machine may utilize an overflow module 118 to capture excess powder material 120 in an overflow chamber 154. The overflow module 118 may include an overflow piston 156 that gradually lowers to make room within the overflow chamber 154 for additional excess powder material 120.

It will be appreciated that an additive manufacturing machine may not utilize a powder module 116 and/or an overflow module 118, and that other systems may be provided for handling the powder material 120, including different powder supply systems and/or excess powder recapture systems. The subject matter of the present disclosure may be practiced with any suitable additive manufacturing machine without departing from the scope hereof.

Still referring to FIG. 15, an additive manufacturing machine 102 may include an imaging system 158 configured to monitor one or more operating parameters of an additive manufacturing machine 102, one or more parameters of an energy beam system 500, and/or one or more operating parameters of an additive manufacturing process. The imaging system may a calibration system configured to calibrate one or more operating parameters of an additive manufacturing machine 102 and/or of an additive manufacturing process. The imaging system 158 may be a melt pool monitoring system. The one or more operating parameters of the additive manufacturing process may include operating parameters associated with additively manufacturing a three-dimensional object 114. The imaging system 158 may be configured to detect an imaging beam such as an infrared beam from a laser diode and/or a reflected portion of an energy beam (e.g., a first energy beam 522a and/or a second energy beam 522b).

The energy beam system 500 and/or the imaging system 158 may include one or more detection devices. The one or more detection devices may be configured to determine one or more parameters of an energy beam system 500, such as one or more parameters associated with irradiating the sequential layers of the powder bed 138 based at least in part on an assessment beam detected by the imaging system 158. One or more parameters associated with irradiating the sequential layers of the powder bed 138 may include irradiation parameters and/or object parameters, such as melt pool monitoring parameters. The one or more parameters determined by the imaging system 158 may be utilized, for example, by the control system 104, to control one or more operations of the additive manufacturing machine 102 and/or of the additive manufacturing system 100. The one or more detection devices may be configured to obtain assessment data of the build plane 130 from a respective assessment beam. An exemplary detection device may include a camera, an image sensor, a photo diode assembly, or the like. For example, a detection device may include charge-coupled device (e.g., a CCD sensor), an active-pixel sensor (e.g., a CMOS sensor), a quanta image device (e.g., a QIS sensor), or the like. A detection device may additionally include a lens assembly configured to focus an assessment beam along a beam path to the detection device. An imaging system 158 may include one or more imaging optical elements (not shown), such as mirrors, beam splitters, lenses, and the like, configured to direct an assessment beam to a corresponding detection device.

In addition, or in the alternative, to determining parameters associated with irradiation the sequential layers of the powder bed 138, the imaging system 158 may be configured to perform one or more calibration operations associated with an additive manufacturing machine 102, such as a calibration operation associated with the energy beam system 500, or particularly the energy beam generator 510, one or more of the various the optical elements 514, 524, 534, the translation system 520, or other components thereof, and/or the imaging system 158 or components thereof. The imaging system 158 may be configured to project an assessment beam and to detect a portion of the assessment beam reflected from the build plane 130. The assessment beam may be projected by energy beam generator 510 and/or a separate beam source associated with the imaging system

158. Additionally, and/or in the alternative, the imaging system 158 may be configured to detect an assessment beam that includes radiation emitted from the build plane 130, such as radiation from an energy beam 522 reflected from the powder bed 138 and/or radiation emitted from a melt pool in the powder bed 138 generated by an energy beam 522 and/or radiation emitted from a portion of the powder bed 138 adjacent to the melt pool. The imaging system 158 may include componentry integrated as part of the additive manufacturing machine 102 and/or componentry that is provided separately from the additive manufacturing machine 102. For example, the imaging system 158 may include componentry integrated as part of the energy beam system 500. Additionally, or in the alternative, the imaging system 158 may include separate componentry, such as in the form of an assembly, that can be installed as part of the energy beam system 500 and/or as part of the additive manufacturing machine 102.

Representative examples of suitable powder materials for embodiments of the apparatus depicted and described herein may include metallic alloy, polymer, or ceramic powders. Exemplary metallic powder materials are stainless steel alloys, cobalt-chrome, aluminum alloys, titanium alloys, nickel based superalloys, and cobalt based superalloys. In addition, suitable alloys may include those that have been engineered to have good oxidation resistance, known "superalloys" which have acceptable strength at the elevated temperatures of operation in a gas turbine engine, e.g. Hastelloy, Inconel alloys (e.g., IN 738, IN 792, IN 939), Rene alloys (e.g., Rene N4, Rene N5, Rene 80, Rene 142, Rene 195), Haynes alloys, Mar M, CM 247, CM 247 LC, C263, 718, X-850, ECY 768, 282, X45, PWA 1483 and CMSX (e.g. CMSX-4) single crystal alloys. The manufactured objects of the present disclosure may be formed with one or more selected crystalline microstructures, such as directionally solidified ("DS") or single-crystal ("SX").

Figure 16:
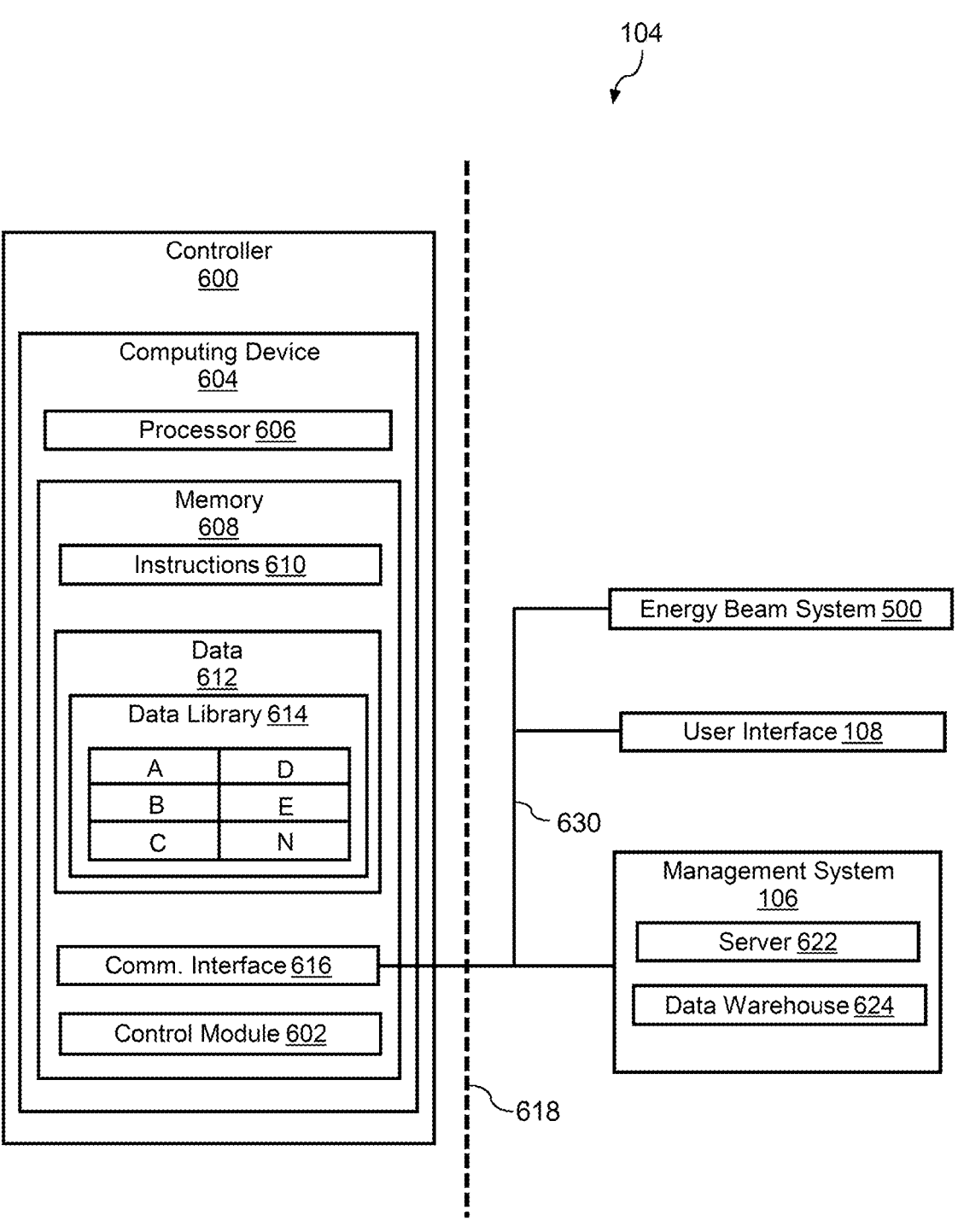
FIG. 16 schematically depicts an exemplary controls system that may be configured to control an additive manufacturing system apparatus including an energy beam system in accordance with aspects of the present disclosure.

Referring now to FIG. 16, an exemplary control system 104 will be described. The control system 104 may be configured to perform one or more control operations associated with the additive manufacturing system 100, the additive manufacturing machine 102, and/or the energy beam system 500. The control operations may include, one or more control commands may be configured to control operations of the energy beam system 500.

As shown in FIG. 16, the exemplary control system 104 includes a controller 600. The controller 600 may include one or more control modules 602 configured to cause the controller 600 to perform one or more control operations. The one or more control modules 602 may include control logic executable to provide control commands configured to control one or more controllable components associated with the additive manufacturing machine 102, such as controllable components associated with the energy beam system 500 and/or an imaging system 158. For example, a control module 602 may be configured to provide one or more control commands executable to control operation of one or more components of the energy beam system 500, such as the energy beam generator 510, the optical translation system 520, or the member 530, or a solid-state optical modulator, a beam modulator, a power source, and/or a temperature control element, and/or any one or more other components thereof. In various embodiments, the controller 600 is configured operate the system 500 via receiving, obtaining, measuring, determining, or transmitting one or more signals corresponding to desirably translating, moving, or otherwise positioning the steering optic 524 or to actuate the translation system 520 or member 530 in accordance with desired positions of the steering optic 524. Various embodiments of the controller 600 particularly receive signals corresponding to a position or movement of the translation system 520 and/or member 530 indicative of a position of the steering optic 524. The signals may particularly correspond to the first translator device 526 and the second translator device 528 and/or member 530, such as to provide and receive signals corresponding to the first steering direction H and the second steering direction T along plane P, the angle 502, and/or the length 503, such as described herein. The signals may still particularly correspond to a movement, command, extension, articulation, actuation, translation, or other movement of the actuation devices 536, 538 or members 530 corresponding to movement and positioning of the steering optic 524 such as described herein.

The controller 600 may be communicatively coupled with an additive manufacturing machine 102. The controller 600 may be communicatively coupled with one or more components of an additive manufacturing machine 102, such as one or more components of an energy beam system 500 and/or an irradiation device 142, such as the energy beam generator 510, a modulation beam generation device, a solid-state optical modulator, a beam modulator, a power source, and/or a temperature control element, and/or any one or more other elements thereof. The controller 600 may also be communicatively coupled with a management system 106 and/or a user interface 108.

The controller 600 may include one or more computing devices 604, which may be located locally or remotely relative to an additive manufacturing machine 102 and/or the system 500. The one or more computing devices 604 may include one or more processors 606 and one or more memory device 608. The one or more processors 606 may include any suitable processing device, such as a microprocessor, microcontroller, integrated circuit, logic device, and/or other suitable processing device. The one or more memory device 608 may include one or more computer-readable media, including but not limited to non-transitory computer-readable media, RAM, ROM, hard drives, flash drives, and/or other memory device 608.

As used herein, the terms "processor" and "computer" and related terms, such as "processing device" and "computing device", are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. The memory device 608 may include, but is not limited to, a non-transitory computer-readable medium, such as a random access memory (RAM), and computer-readable nonvolatile media, such as hard drives, flash memory, and other memory devices. Alternatively, a floppy disk, a compact disc-read only memory (CD-ROM), a magneto-optical disk (MOD), and/or a digital versatile disc (DVD) may also be used.

As used herein, the term "non-transitory computer-readable medium" is intended to be representative of any tangible computer-based device implemented in any method or technology for short-term and long-term storage of information, such as, computer-readable instructions, data structures, program modules and sub-modules, or other data in any device. The methods described herein may be encoded as executable instructions embodied in a tangible, non-transitory, computer readable media, including, without limitation, a storage device and/or a memory device. Such instructions, when executed by a processor, cause the processor to perform at least a portion of the methods described herein. Moreover, as used herein, the term "non-transitory computer-readable medium" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

The one or more memory device 608 may store information accessible by the one or more processors 606, including computer-executable instructions 610 that can be executed by the one or more processors 606. The instructions 610 may include any set of instructions which when executed by the one or more processors 606 cause the one or more processors 606 to perform operations, including optical element monitoring operations, maintenance operations, cleaning operations, calibration operations, and/or additive manufacturing operations. In particular embodiments, the instructions 610 may include instructions to set, adjust, or modulate the angle 502, the length 503, the position of the steering optic 524, a relative position of the first optical element 514 versus the steering optic 524 and/or third optical element 534, or other articulatable elements depicted and described herein. Instructions may include articulating one or more optical elements via the respective translation system; articulating one or more articulation devices operably coupled to the translation system; moving or translating the optical element along the plane P; or tilting one or more optical elements to generate angle 502 relative to surface 540.

The memory device 608 may store data 612 accessible by the one or more processors 606. The data 612 can include current or real-time data 612, past data 612, or a combination thereof. The data 612 may be stored in a data library 614. As examples, the data 612 may include data 612 associated with or generated by an additive manufacturing system 100 and/or an additive manufacturing machine 102, including data 612 associated with or generated by the controller 600, an additive manufacturing machine 102, an energy beam system 500, an imaging system 158, a management system 106, a user interface 108, and/or a computing device 604, such as operational data 612 and/or calibration data 612 pertaining thereto. The data 612 may also include other data sets, parameters, outputs, information, associated with the additive manufacturing system 100 and/or an additive manufacturing machine 102.

The one or more computing devices 604 may also include a communication interface 616, which may be used for communications with a communication network 618 via wired or wireless communication lines 630. The communication interface 616 may include any suitable components for interfacing with one or more network(s), including for example, transmitters, receivers, ports, controllers, antennas, and/or other suitable components. The communication interface 616 may allow the computing device 604 to communicate with various nodes on the communication network 618, such as nodes associated with the additive manufacturing machine 102, the energy beam system 500, the imaging system 158, the management system 106, and/or a user interface 108. The communication network 618 may include, for example, a local area network (LAN), a wide area network (WAN), SATCOM network, VHF network, a HF network, a Wi-Fi network, a WiMAX network, a gatelink network, and/or any other suitable communication network 618 for transmitting messages to and/or from the controller 600 across the communication lines 620. The communication lines 620 of communication network 618 may include a data bus or a combination of wired and/or wireless communication links.

The communication interface 616 may allow the computing device 604 to communicate with various components of an additive manufacturing system 100 and/or an additive manufacturing machine 102 communicatively coupled with the communication interface 616 and/or communicatively coupled with one another. The communication interface 616 may additionally or alternatively allow the computing device 604 to communicate with the management system 106 and/or the user interface 108. The management system 106 may include a server 622 and/or a data warehouse 624. As an example, at least a portion of the data 612 may be stored in the data warehouse 624, and the server 622 may be configured to transmit data 612 from the data warehouse 624 to the computing device 604, and/or to receive data 612 from the computing device 604 and to store the received data 612 in the data warehouse 624 for further purposes. The server 622 and/or the data warehouse 624 may be implemented as part of a control system 104 and/or as part of the management system 106.

The system 500 depicted and described herein may be applied to electromagnetic devices, energy beams, or laser apparatuses generally, such as to allow for more compact packaging and quicker directional change and movement while retaining or improving beam focus, accuracy, precision, and intensity. Such systems may include manufacturing apparatuses generally, including additive machines such as described herein, or laser-cutting apparatuses, energy beam systems, directed-energy systems, or other light, laser, or electromagnetic beam systems.

For example, methods are also generally described.

This written description uses examples to disclose the preferred embodiments, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the disclosure are provided by the subject matter of the following clauses:

1. An energy beam system comprising: an energy beam generator configured to output an energy beam through a first optical element along a first direction; and an optical translation system comprising a steering optic and a translator apparatus, wherein the optical translation system is positioned to receive the energy beam through the steering optic, and wherein the translator apparatus is configured to translate the steering optic along a plane that is non-parallel to the first direction to induce an angular shift in the energy beam.

2. The energy beam system of any preceding clause, wherein the plane is substantially perpendicular to the first direction.

3. The energy beam system of any preceding clause, wherein the translator apparatus comprises: a first translator device configured to translate the steering optic along a first steering direction within the plane; and a second translator device configured to translate the steering optic along a second steering direction within the plane, wherein the second steering direction is substantially perpendicular to the first steering direction.

4. The energy beam system of any preceding clause, wherein the translator apparatus comprises rails extended along the first steering direction and the second steering direction, wherein the translator apparatus is configured to translate along the plane.

5. The energy beam system of any preceding clause, wherein an actuation device is operably coupled to the translator apparatus, the actuation device configured to translate the steering optic along the plane via the translator apparatus.

6. The energy beam system of any preceding clause, wherein the actuation device is a linear motion actuation system.

7. The energy beam system of any preceding clause, wherein the actuation device is one or more of a piezo transducer, a solenoid actuator, a voice coil actuator, a pulley-based system, a screw-based system, or other appropriate linear actuator.

8. The energy beam system of any preceding clause, wherein the translator apparatus comprises: a first translator device operably coupled to a first actuation device, wherein the first actuation device is configured to translate the first translator device coupled to the steering optic along a first steering direction within the plane; and a second translator device operably coupled to a second actuation device, wherein the second actuation device is configured to translate the second translator device coupled to the steering optic along a second steering direction within the plane, wherein the second steering direction is substantially perpendicular to the first steering direction.

9. The energy beam system of any preceding clause, wherein the first optical element is a collimating lens.

10. The energy beam system of any preceding clause, wherein the first optical element is a concave lens, and wherein the steering optic is a convex lens.

11. The energy beam system of any preceding clause, further comprising: a member extended substantially along the first direction, wherein the member is connected to the energy beam generator and the optical translation system.

12. The energy beam system of any preceding clause, wherein the member is a linear motion actuation system configured to extend along a length to tilt the steering optic at an angle relative to an axis extended along the first direction.

13. The energy beam system of any preceding clause, wherein the first optical element has a thickness, and wherein the member is configured to position the first optical element along the first direction from the steering optic within a range of up to 0.5 times the thickness of the first optical element.

14. The energy beam system of any preceding clause, further comprising: a controller comprising a processor and a memory device, wherein the memory device stores instructions that, when executed by the processor, cause the energy beam system to perform operations, wherein the operations comprise: articulating the translator apparatus to translate the steering optic along the plane.

15. The energy beam system of any preceding clause, the operations comprising: tilting the steering optic to generate an angle relative to an axis along the first direction.

16. An energy beam system comprising: one or more energy beam generators configured to output a plurality of energy beams; and a plurality of optical translation systems, wherein each of the plurality of optical translation systems comprises: a steering optic positioned to receive one of the plurality of energy beams from the one or more energy beam generators; and a translator apparatus configured to translate the steering optic along a plane to induce an angular shift in the one of the plurality of energy beams received by the steering optic.

17. The energy beam system of any preceding clause, wherein the translator apparatus translates the steering optic in a planar direction that is substantially perpendicular to an initial direction of the one of the plurality of energy beams received by the steering optic.

18. The energy beam system of any preceding clause, wherein the plurality of optical translation systems can independently induce a plurality of different angular shifts in the plurality of energy beams.

19. An additive manufacturing machine comprising: a build module forming a build chamber within which an object is additively manufactured; a powder module configured to provide a supply of powder material to a build platform; and an energy beam system comprising an energy beam generator configured to output an energy beam through a first optical element along a first direction, and wherein the energy beam system comprises an optical translation system positioned to receive the energy beam through a steering optic, wherein the steering optic is positioned within a translator apparatus, and wherein the translator apparatus is configured to translate the steering optic along a plane that is non-parallel to the first direction to induce an angular shift in the energy beam.

20. The additive manufacturing machine of any preceding clause, the additive manufacturing machine comprising a controller comprising a processor and a memory device, wherein the memory device stores instructions that, when executed by the processor, cause the energy beam system to perform operations, wherein the operations comprise: articulating the translator apparatus to translate the steering optic along the plane.

21. A method comprising: outputting an energy beam through a first optical element along a first direction into a steering optic of an optical translation system; adjusting the steering optic with a translator apparatus to translate the steering optic along a plane that is non-parallel to the first direction to induce an angular shift in the energy beam.

What is claimed is:

1. An energy beam system comprising: an energy beam generator configured to output an energy beam through a first optical element along a first direction;
an optical translation system comprising a steering optic and a translator apparatus, wherein the beam generator, the first optical element, and the steering optic are co-linear, wherein the optical translation system is positioned to receive the energy beam through the steering optic, and wherein the translator apparatus is configured to translate the steering optic along a plane that is non-parallel to the first direction to induce a first angular shift in the energy beam, the optical translation system configured to translate the steering optic along a first steering direction within the plane and a second steering direction within the plane, wherein the second steering direction is substantially perpendicular to the first steering direction; and
first and second members connecting the energy beam generator to the optical translation system, wherein the first member connects a first point of the first optical element and a first point of the steering optic, and wherein the second member connects a second point of the first optical element and a second point of the steering optic, and wherein the first member and the second member each expand and contract to relatively position the steering optic with respect to the first optical element to induce a second angular shift in the energy beam, wherein the second angular shift is greater than the first angular shift.

2. The energy beam system of claim 1, wherein the plane is substantially perpendicular to the first direction.

3. The energy beam system of claim 1, wherein the translator apparatus comprises rails extending along the first steering direction and the second steering direction, wherein the translator apparatus is configured to translate along the plane.

4. The energy beam system of claim 1, wherein an actuation device is operably coupled to the translator apparatus, the actuation device configured to translate the steering optic along the plane via the translator apparatus.

5. The energy beam system of claim 4, wherein the actuation device is a linear motion actuation system.

6. The energy beam system of claim 4, wherein the actuation device is one or more of a piezo transducer, a solenoid actuator, a voice coil actuator, a pulley-based system, a screw-based system, or other appropriate linear actuator.

7. The energy beam system of claim 1, wherein the translator apparatus comprises:
a first translator device operably coupled to a first actuation device, wherein the first actuation device is configured to translate the first translator device coupled to the steering optic along the first steering direction; and
a second translator device operably coupled to a second actuation device, wherein the second actuation device is configured to translate the second translator device coupled to the steering optic along the second steering direction, wherein the second steering direction is substantially perpendicular to the first steering direction.

8. The energy beam system of claim 1, wherein the first optical element is a collimating lens.

9. The energy beam system of claim 1, wherein the first optical element is a concave lens, and wherein the steering optic is a convex lens.

10. The energy beam system of claim 1,
wherein the first and second members extend at least along the first direction.

11. The energy beam system of claim 10, wherein the first and second members are each a linear motion actuation system configured to extend along a length to tilt the steering optic at an angle relative to an axis extended along the first direction.

12. The energy beam system of claim 11, wherein the first optical element has a thickness, and wherein at least one of the first member or the second member is configured to position the first optical element along the first direction from the steering optic within a range of up to 0.5 times the thickness of the first optical element.

13. The energy beam system of claim 1 further comprising:
a controller comprising a processor and a memory device, wherein the memory device stores instructions that, when executed by the processor, cause the energy beam system to perform operations, wherein the operations comprise:

articulating the translator apparatus to translate the steering optic along the plane.

14. The energy beam system of claim 13, the operations comprising:

tilting the steering optic to generate an angle relative to an axis along the first direction.

15. An energy beam system comprising:

one or more energy beam generators configured to output a plurality of energy beams;

a plurality of optical translation systems, wherein each of the plurality of optical translation systems comprises:

a steering optic positioned to receive one of the plurality of energy beams from the one or more energy beam generators; and a translator apparatus configured to translate the steering optic along a plane to induce a first angular shift in the one of the plurality of energy beams received by the steering optic, the translator apparatus configured to translate the steering optic along a first steering direction within the plane and a second steering direction within the plane, wherein the second steering direction is substantially perpendicular to the first steering direction; and first and second members connecting the energy beam generator to the optical translation system, wherein the first member connects a first point of the first optical element and a first point of the steering optic, and wherein the second member connects a second point of the first optical element and a second point of the steering optic, and wherein the first member and the second member each expand and contract to relatively position the steering optic with respect to the first optical element to induce a second angular shift in the energy beam, wherein the second angular shift is greater than the first angular shift.

16. The energy beam system of claim 15, wherein the translator apparatus translates the steering optic in a planar direction that is substantially perpendicular to an initial direction of the one of the plurality of energy beams received by the steering optic.

17. The energy beam system of claim 15, wherein the plurality of optical translation systems can independently induce a plurality of different angular shifts in the plurality of energy beams.

18. An additive manufacturing machine comprising:

a build module forming a build chamber within which an object is additively manufactured;

a powder module configured to provide a supply of powder material to a build platform; and the energy beam system of claim 1.

19. The additive manufacturing machine of claim 18, further comprising:

a controller comprising a processor and a memory device, wherein the memory device stores instructions that, when executed by the processor, cause the energy beam system to perform operations, wherein the operations comprise: articulating the translator apparatus to translate the steering optic along the plane.

\* \* \* \* \*